United States Patent Office 3,646,140
Patented Feb. 29, 1972

3,646,140
HEXA-ALKYL-ALKYLENEDIAMINE DIQUARTER-
NARY DIHALIDE HALOGEN COMPLEXES AND
THEIR USE
Robert M. Thomas, Fred R. Gerns, and John L. Sands,
West Lafayette, Ind., assignors to Great Lakes Chemi-
cal Corporation, West Lafayette, Ind.
No Drawing. Continuation-in-part of application Ser. No.
770,063, Oct. 23, 1968. This application Mar. 3, 1970,
Ser. No. 16,215
Int. Cl. C07c 87/30
U.S. Cl. 260—567.6 P 7 Claims

ABSTRACT OF THE DISCLOSURE

Halogen complexes of hexa-alkyl-alkylenediamine di-
quaternary dihalides are halogenating, defoliant, bacterio-
cidal and herbicidal agents.

This invention relates to novel quaternary dihalide halo-
gen complexes, more particularly to halogen charge trans-
fer complexes of hexa-alkyl-alkylenediamine diquaternary
dihalides wherein an alkyl group attached to each amine
is higher alkyl, and to their use, particularly as defoliants
and herbicides.

RELATED APPLICATION

This application is a continuation-in-part of application
770,063, filed Oct. 23, 1968, now abandoned.

OBJECTS OF THE INVENTION

It is an object of the invention to provide novel hexa-
alkyl-alkylenediamine diquaternary dihalide halogen com-
plexes. Another object is the provision of a method for
their use as cotton defoliants and herbicidal agents. Other
objects will be apparent to those skilled in the art to
which this invention pertains.

BACKGROUND OF INVENTION

Certain halogen addition products of quaternary halides
are known in the art. They have been used to sterilize
water (U.S. 3,152,073), as germicidal detergents (U.S.
2,746,928), as anti-bacterial and anti-fungal agents (U.S.
2,868,686) and as germicides (U.S. 3,028,301, U.S. 2,679,-
533). Some of the hexa-alkyl-alkylenediamine diquater-
nary dihalides used as starting materials to produce the
novel halogen complexes of this invention are known.
Others can be produced by quaternizing the known tetra-
alkyl-alkylenediamines with an alkyl halide or the known
trialkylamine with an alkylene dihalide. It was not here-
tofore known that herbicidal activity could be imparted
to hexa-alkyl-alkylenediamines. Known utilities for these
compounds and the diquaternary salts are as dyes and
dyeing aids. In particular, these compounds are known
as retarders (U.S. Pat. 2,891,835).

As stated, certain halogenated complexes are known
in the art. The tetrabutyl ammonium tribromide type
complex is disclosed and the ultraviolet absorption spec-
tra studied in Journal American Chemical Society, volume
73, page 425 (1951). It was there recognized that poly-
halides of organic molecules, especially those containing
nitrogen, have been known since the early days of organic
chemistry. In many cases such compounds have been
prepared as solid derivatives of the parent compound.
The spectra obtained for these complexes was different
than the additive spectrum for the parent bromine com-
pound and the bromine introduced into the complex. Our
own studies, as hereinafter reported, confirm that absorp-
tion in the ultraviolet range is a characteristic of the
invention exhibited by the complexes whereas it is not
a characteristic exhibited by the precursor material.

DESCRIPTION OF THE INVENTION

The following is a description of the manner of making
and using and the best mode contemplated of carrying
out the invention.

The diquaternary dihalide halogen complexes of this
invention in contradistinction to the starting diquaternary
halides, are defoliants as well as post-emergent herbicides.
Bromine complexes are particularly useful for this pur-
pose. They are also useful as halogenating and germicidal
or bacteriocidal agents. The discovery that the halogen
complexes of this invention are characterized by defoliant
activity and herbicidal activity is of substantial economic
importance, because the corresponding parent diquater-
nary dihalides are substantially cheaper than dipyridylium
diquaternary dihalides which are known to possess herbi-
cidal activity but not defoliant activity. (See U.S. 2,823,-
987, 2,972,528, 3,202,500, and 3,332,959.)

Defoliation is of substantial importance in the cotton
industry because defoliation better prepares the mature
cotton plants for mechanical harvest by reducing the
quantity of dessicated leaves collected along with the
cotton bolls, thereby upgrading the quality of the har-
vested cotton. Another significant advantage inherent in
the use of a defoliant as a harvest aid is its effect on
the opening of the cotton bolls. The halogen complexes
of this invention are superior to the starting quaternary
dihalides as defoliants. Their defoliating activity also
renders them useful for rapidly clearing jungle areas and
railroad and utility rights-of-way.

The halogen complexes of this invention also possess
anti-bacterial activity. They are active against gram posi-
tive and gram negative bacteria. They can, for example,
be used for this purpose in the manner taught in U.S.
3,028,301 (environmental sanitation), and 3,152,073
(sterilization of water).

The compounds of the invention can be used conven-
iently as defoliants by applying them to the area to be
defoliated. Usually, they are applied in an amount effec-
tive to at least substantially defoliate the flora of the treat-
ed area. Generally, an amount up to about 10 pounds
per acre is employed. Higher amounts are also effective
but do not appear to result in increased defoliation. Ordi-
narily, an amount of the selected compound between
about 2 and 8 pounds per acre, preferably about 4 to 6
pounds per acre, is employed, the exact amount depend-
ing on the type of plant to be defoliated, the plant density
per area, and the percentage of defoliant lost by drift dur-
ing application. A high level of defoliation can be effected
in this manner, varying the exact procedure and amounts
applied to suit conditions in the particular case, as will be
apparent to one skilled in the art.

The compounds of this invention can also be used as
herbicides by applying them to the area to be devegetated.

Usually they are applied for this purpose in an amount effective to at least substantially damage and preferably kill the flora of the treated area. Generally, an amount up to 25 pounds per acre is employed. Higher amounts are also effective but ordinarily do not result in increased defoliation. Generally, the selected compound is employed in an amount between about 0.2 and 10 pounds per acre, preferably between 0.5 and 5 pounds per acre, the exact amount depending on the exact result desired, the type of plants to be killed, their density, age and extent of growth, and the percentage of herbicide lost by drift during application. For example, pigweed, tomato, radish, cucumber, red kidney bean plants, wheat, Johnson grass, oat, cotton, etc., are all killed or severely damaged by applying N,N' - didodecyl-tetramethyl-ethylene-diammonium dibromide dibromine complex uniformly thereto at a rate of 0.5 to 2 pounds per acre. At higher treatment levels (2.5 to 10 pounds per acre), 100 percent kill of virtually all types of plants can be achieved.

In order to apply the halogen complex uniformly, for whatever purpose, it is usually applied in combination or admixture with an inert or synergizing carrier, which may be either solid or liquid. Because the complex can rapidly lose its elemental halogen in the presence of readily halogenated compounds, it is usually mixed with the halogen complex just prior to use, especially if the carrier is susceptible to halogenation. After mixture with the selected carrier, the composition is applied in any conventional manner to the area to be sanitized or flora to be treated. It may also be applied in dry mixed form with a powder carrier which will adhere to the plants or the area to be treated. It can be applied as a suspension in water or in a non-ionic carrier, e.g., gasoline, kerosene or light oil, or as a solution in an organic solvent in which it is soluble, e.g., in ethylene chloride.

Except for giving due consideration to their water insolubility and their ability to halogenate compounds mixed therewith which are readily halogenatable with elemental halogen, the compounds of this invention can be used as herbicides in the same manner as known herbicides, e.g., the dipyridylium quaternary dihalides. For a description of such a manner of use see U.S. 3,202,500 and 3,332,995.

The hexa-alkyl-alkylenediamine dihalide halogen compounds of this invention, which can also be named, in the case of ethylene bridged compounds, as 1,2-bis(di-lower-alkyl alkyl)-ethane dibromide dibromine complexes, can be represented by the following generic structural formula:

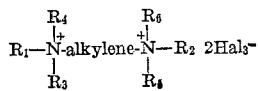

wherein $R_1$ and $R_2$ are alkyl of 4 to 18 carbon atoms, preferably 6 to 16 and more preferably 8 to 14; and $R_3$, $R_4$, $R_5$ and $R_6$ are lower-alkyl of 1 to 4 carbon atoms, preferably methyl; $Hal_3^-$ is a trihalide ion in which the halogen has an atomic weight of 35 to 80, inclusive, e.g., $Br_3^-$, $ClBr_2^-$, $Cl_2Br^-$, preferably $Br_3^-$; and alkylene contains 1 to 3 carbon atoms, inclusive, preferably 2. For example, $R_1$ and $R_2$ can be n-hexyl, i-hexyl, cyclohexyl, heptyl, octyl, nonyl, decyl, undecyl, dodecyl, hexadecyl; $R_3$, $R_4$, $R_5$ and $R_6$ each can be $CH_3$, $C_2H_5$, n-$C_3H_7$, i-$C_3H_7$, t-butyl, etc., preferably methyl or ethyl, and alkylene can be methylene, ethylene, trimethylene, propylene, etc., preferably ethylene. The halogen in $Hal_3^-$ can be chlorine, bromine or a combination of chlorine and bromine.

It will be apparent to those skilled in the art that, although it is generally accepted that elemental and anionic halogen combine to form the trihalide anion [$Hal_3^-$], the formula $Hal^-·Hal_2$ also reasonably accurately defines the trihalide complex because of the fact that the halogen is only loosely bonded. Some experts in the field have in fact, for this reason, referred to such complexes as "halogen charge transfer complexes."

The following are representative compounds of this invention included within the scope of the above formula:

TABLE I

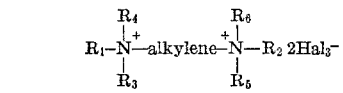

| Compound | $R_1$, $R_2$ | $R_3$, $R_4$ $R_5$, $R_6$ | $Hal_3^-$ | Alkylene |
|---|---|---|---|---|
| 1 | n-$C_{12}H_{25}$ | $C_2H_4$ | $Br_3^-$ | $C_2H_4$ |
| 2 | Same | $CH_3$ | $Br_3^-$ | $CH_2$ |
| 3 | do | $CH_3$ | $Br_3^-$ | $C_2H_4$ |
| 4 | do | $CH_3$ | $ClBr_2^-$ | $C_2H_4$ |
| 5 | do | $CH_3$ | $ClBr_2^-$ | $C_2H_4$ |
| 6 | do | $CH_3$ | $Cl_3^-$ | $C_2H_4$ |
| 7 | do | i-$C_3H_7$ | $Br_3^-$ | $C_2H_4$ |
| 8 | do | n-$C_3H_7$ | $Br_3^-$ | $C_2H_4$ |
| 9 | n-$C_4H_9$ | $CH_3$ | $Br_3^-$ | $C_2H_4$ |
| 10 | n-$C_6H_{13}$ | $CH_3$ | $Br_3^-$ | $C_2H_4$ |
| 11 | n-$C_8H_{17}$ | $CH_3$ | $Br_3^-$ | $C_2H_4$ |
| 12 | n-$C_{10}H_{21}$ | $CH_3$ | $Br_3^-$ | $C_2H_4$ |
| 13 | n-$C_{12}H_{25}$ | $CH_3$ | $Br_3^-$ | $C_2H_4$ |
| 14 | n-$C_{16}H_{33}$ | $CH_3$ | $Br_3^-$ | $C_2H_4$ |

Compounds 1-3 and 7-14 are produced by mixing the corresponding diquaternary dibromide with about two molar equivalents of bromine. Compound 4 is produced using two molar equivalents of chlorine and the diquaternary dibromide. Compound 5 is produced using two molar equivalents of bromine and the corresponding diquaternary dichloride. Compound 6 is produced from the diquaternary dichloride and two molar equivalents of chlorine.

The presence of non-interfering functional groups on the alkyl groups attached to the nitrogen atoms of the 3,3'- and 4,4'-diquaternary ammonium molecules will not affect the usefulness of the diquaternary dihalide halogen complexes as halogenating, anti-bacterial, defoliant, and herbicidal agents. Such substituted compounds are therefore equivalents of the corresponding unsubstituted compounds. For example, one or more but preferably only one of $R_1$ and $R_2$ can be alkyl in which the terminal or intermediate bridging carbon atom is substituted, e.g., with halogen, carboxyl, carbo-lower-alkoxy, phenyl, substituted phenyl, e.g., halophenyl, bromophenyl, nitrophenyl, tolyl, xylyl, etc.

The compounds of this invention are solids, usually crystalline and colored when they contain bromine. They are substantially insoluble in water and in most inert organic solvents. They are soluble in halogenated hydrocarbons and dimethylformamide. The elemental halogen used to form the trihalide anion is titratable and, when formed from two molar equivalents of halogen, the titer is usually 80–98% of theory. Because the halogen is titratable, the compounds can, if desired, be used a halogenating agents.

The compounds of this invention are prepared by mixing about two molar equivalents of the selected halogen or mixture of halogens, e.g., $Cl_2$, $Br_2$, $ClBr$, with the selected starting diquaternary dihalide. This mixing can be conducted in the presence of a solvent normally used for halogenation reactions, e.g., glacial or aqueous acetic acid, chloroform, carbon tetrachloride, water or aqueous NaBr or NaCl. The choice of solvent is determined by the solubility of the starting quaternary salt in the solvent. For this reason, aqueous systems are generally preferred.

The reaction is preferably conducted at between $-10°$ and $25°$ C., the lower temperature limit being determined by the solubility of the reactants in the selected solvent system and the upper temperature limit being determined by the rate of decomposition of the product and/or side reactions which may develop at higher temperatures.

If a mixed elemental halogen complex is desired, the halogens can be added concurrently or successively in amounts calculated to produce the desired molar ratio. For example, the selected starting quaternary dichloride or dibromide can be mixed first with one molar equivalent of chlorine followed by a molar equivalent of bromine or with two molar equivalents of chlorobromide to produce the chlorobromine complex ($ClBr_2^-$ or $BrCl_2^-$).

If the starting quaternary dihalide is a dichloride, simultaneously with the formation of the halogen complex it can be reacted with two molar equivalents of NaBr or KBr to form the quaternary dibromide salt. Reaction with one molar equivalent of the NaBr or KBr produces a mixed quaternary dihalide.

The starting quaternary dihalides are prepared by reacting a tetraalkyl-alkylenediamine with an amount of the selected alkylating agent sufficient to quaternize both nitrogen atoms. Thus, at least two molar equivalents of the selected alkyl chloride or bromide and at least one molar equivalent of the selected alkylene dichloride or dibromide are employed. Ordinarily, a large excess over these amounts is employed. Conventional quaternizing conditions are used. See U.S. 2,271,378, 2,287,465, 2,375,853, and 2,933,529.

The following illustrate the making and using of the compounds of this invention which is not limited thereto.

Example 1.—1,2-bis-(dimethyldodecylammonium)-ethane bistribromide (a) A mixture of 1958 g. (9.19 moles) N,N-dimethyldodecylamine (Eastman), and 752 g. (4.00 moles) ethylene dibromide (Fisher) in 1298 g. 1-propanol was stirred and refluxed a total of 26 hours. After 5 hours, a bromide ion titration with silver nitrate showed the reaction to be 91.5% complete. After 26 hours, the titration showed the reaction to have gone to 94% completion. Most of the propanol was removed in vacuo and the residue was triturated with ethyl ether. The precipitate formed was filtered off and the filter cake was washed on the funnel with ethyl ether until the color had been removed yielding a cream colored solid. This procedure yielded a total of 1203 g. (49%) of 1,2-bis-(dimethyldodecylammonium)-ethane dibromide as a light colored solid melting at 140–160° C.

(b) 416 g. (0.68 mole) of the thus produced 1,2-bis-(dimethyldodecylammonium)-ethane dibromide was dissolved in 1500 ml. methylene chloride. To this solution was added slowly with stirring, 218 g. (1.36 moles) bromine. The solution was stirred 15 minutes, then the solvent was removed in vacuo using a warm water bath. The temperature of the bath was gradually raised to 70° to partially melt the bromine complex such that it could be poured. This procedure yielded 629 g. (99%) of 1,2-bis-(dimethyldodecylammonium)-ethane bistribromide as an orange solid melting at 62–72° C. A standard thiosulfate titration showed the material to contain 98% of the theoretical amount of titratable bromine.

Example 2.—Bis-(dimethyldodecylammonium)-methane bis-tribromide (a) A mixture of 95.8 g. (0.45 mole) N,N-dimethyldodecylamine (Eastman) and 34.8 g. (0.20 mole) methylene dibromide (Aldrich) in 240 g. 1-propanol was refluxed 16 hours. After removal of solvent in vacuo, the residue was triturated with ethyl ether and the precipitate filtered. The filter cake was slurried with ethyl ether and filtered, then air dried. This procedure yielded 73 grams (61% yield) of bis - (dimethyldodecylammonium)-methane dibromide as a solid melting at 125–155° C.

(b) A mixture of 12.8 g. (0.08 mole) bromine and 20.6 g. (0.20 mole) sodium bromide (Fisher) in 200 ml. water was added slowly with stirring to 24 g. (0.04 mole) bis-(dimethyldodecylammonium)-methane dibromide in 500 ml. water. An immediate precipitate formed which was filtered off, air dried overnight, then dried completely in vacuum over calcium chloride. This gave 26.5 g., 72% yield, of bis-(dimethyldodecylammonium)-methane bistribromide as a yellow-orange solid melting at 64–70° C. Using a standard thiosulfate titration method, the product titrated for 79% of the theoretical amount of titratable bromine.

Example 3.—1,2-bis-(dimethylisobutylammonium)-ethane bis-tribromide (a) A mixture of 100 g. (0.73 mole) 1-bromo-2-methylpropane (Matheson) and 100 g. (2.20 mole) dimethylamine (Eastman) in 320 g. 1-propanol was charged into a 2 liter stirred autoclave fitted with a glass liner. The reaction was carried out at 100° C. and 30 p.s.i.g. for 3.5 hours. The reaction mixture was treated with excess dry hydrogen chloride, then the solvent was removed in vacuo leaving a solid residue of a mixture of salts of dimethylamine and N,N-dimethylisobutylamine. This was dissolved in a minimum of water and enough solid sodium hydroxide added to saturate the solution. The free N,N-dimethylisobutylamine was distilled from this mixture at 75° C. and 1 atm.

(b) A mixture of 14 g. (0.14 mole) N,N-dimethylisobutylamine and 11.3 g. (0.06 mole) ethylene dibromide (GLCC) in 80 g. 1-propanol was refluxed 16 hours. After removing the solvent in vacuo the residue was dissolved in water, washed with ethyl ether, then the water was removed in vacuo. Chloroform was added to the residue and the rest of the water azeotroped off. This procedure yielded 23.5 g. (100%) of a 1,2-bis-(dimethylisobutylammonium)-ethane dibromide as yellow-brown, semi-solid material which still contained some chloroform.

(c) A mixture of 19.2 g. (0.12 mole) bromine and 20.6 g. (0.20 mole) sodium bromide in 300 ml. water was added slowly with stirring to 23.5 g. (0.66 mole) 1,2-bis-(dimethylisobutylammonium)-ethane dibromide in 500 ml. water. A red oil came out of solution. Chloroform was added to the mixture, but the bromine complex did not appear to go into solution completely. The organic layers were separated from the water, then the solvent was removed in vacuo. More chloroform was added to the residual oil and excess water and bromine was azeotroped off in vacuo. This procedure yielded 19.1 g. (45%) of 1,2-bis-(dimethylisobutylammonium)-ethane bistribromide as a red oil which smelled strongly of bromine. Standard thiosulfate titration showed this complex to contain 87% of the theoretical amount of titratable bromine.

Example 4.—1,2-bis-(dimethyloctylammonium)-ethane bis-tribromide (a) A mixture of 78.5 g. (0.50 mole) N,N-dimethyloctylamine (Eastman) and 41.4 g. (0.22 mole) ethylene dibromide (Fisher) in 60 g. 1-propanol was refluxed a total of 9.25 hours. Bromide ion titration with $AgNO_3$ showed the reaction to be 96% complete. After the solvent was removed in vacuo, ethyl ether was used to triturate the residue. The precipitate formed was filtered off, slurried with ethyl ether, filtered, and the process repeated. 61 g. (51%) of 1,2-bis-(dimethyloctylammonium)-ethane dibromide as a tacky solid was obtained.

(b) A mixture of 38.4 g. (0.24 mole) bromine and 51.5 g. (0.50 mole) sodium bromide in 400 ml. water was added slowly with stirring to 61 g. (0.12 mole) 1,2-bis-(dimethyloctylammonium)-ethane dibromide in 700 ml. water. An oil precipitated out of solution which was extracted with chloroform, washed with water, then dried over anhydrous magnesium sulfate. The chloroform was removed in vacuo yielding 86.2 g. (97%) of 1,2-bis-(dimethyloctylammonium)-ethane bistribromide as a red oil. A thiosulfate titration showed the material to contain 70% of the theoretical titratable bromine.

ULTRAVIOLET COMPARISON OF COMPOUNDS OF THE INVENTION

The compound of Example 1 (code marked GLC 508) was compared with the precursor materials (code marked GLC 549) by ultraviolet spectroscopy. Confirming the findings of prior workers in the field, discussed above, the complex exhibits an absorption peak at 269 m$\mu$ with a molecular extinction of 8500 whereas the precursor material exhibits no absorption peak in the ultraviolet region as can be seen from Table II.

TABLE II

UV.—GLC–508:

in HOAc, $\lambda_{max.}=269$ m$\mu$, $\epsilon$ 269=8500

GLC–549.—Precursor:

in HOAc, no maximum, base line is slightly displaced in H$_2$O, no absorption

It is surprising that the complex is insoluble in water whereas the precursor is completely soluble. The radical change in water solubility indicates a change in the ionic nature of the quaternary when complexed with bromine. Table III shows a comparison of physical properties of the compound of Example 1 and its precursor.

TABLE III.—A. Physical Differences Between Bromine Complex GLC–508 and its Parent Quarternary Salt GLC–549

(a) Color:
GLC–508—orange
GLC–549—white
(b Melting points:
GLC–508: 60–68° (NB 83–62)
GLC–549: 132–138° (NB 108–19)
145–165° (NB 75–82)

| (c) Solubility | 508 | 549 |
|---|---|---|
| DMSO | Soluble | Soluble. |
| Benzene | do | Slight solubility. |
| Acetic acid | Very slight solubility | Soluble. |
| Methylcyclohexane | do | Insoouble. |
| Carbon tetrachloride | Insoluble | Do. |
| Tetrahydrofuran | Soluble | Do. |
| Water | Insoluble | Soluble. |

USE AS COTTON DEFOLIANTS

The bromine complex of Example 1 was field tested as a cotton defoliant under the code number 508.

Because of its insolubility in water and other common solvents, the test compound was made up into a 50 percent wettable powder formulation for field test purposes. Results are reported in Table IV.

TABLE IV

| | Rate, lbs./acre | Percent defoliation | | |
|---|---|---|---|---|
| | | 4 days | 8 days | 12 days |
| Compound 508 | 4 | 10 | 50 | 50 |
| | 6 | 20 | 50 | 50 |
| | 8 | 40 | 75 | 75 |

In tests of compounds of the invention for use as defoliants and desiccants on greenhouse grown cotton, the selected compound is applied in a water suspension of the wettable powder, sprayed onto the plants with standard spraying equipment. No injury occurs to the carpel wall of unopened green bolls when the compounds of the invention are employed, but desiccant and defoliant action is rapid and effective. The tests to date thus show that the compounds of the invention can safely be used as desiccants and defoliants for plants such as cotton and the like.

USE AS POST-EMERGENCE HERBICIDES

The crops employed in the post-emergency herbicidal evaluation were tomatoes, radish, Johnson grass, oats, wheat, cucumbers, red kidney beans, pigweed and cotton. Cotton is normally in the 4 to 6 leaf stage at the time of spray application and the red kidney beans have a well expanded set of first true leaves. Tomatoes, radish, and cucumbers are normally two weeks of age at the time of application Johnson grass is normally approximately 2 inches in height at the time of application.

The compounds to be tested are prepared as 50% wettable powders and extended in water to obtain the deisred final spray suspension. The materials are applied at a rate of 5 pounds per acre (active ingredient) calculated on a broadcast basis. A standard (Karmex) and control (vehicle only) are also employed.

The plants are scored for phytotoxicity 10 to 12 days after spray application. Phytotoxicity ratings are based upon a scale of 0 to 10, 0 indicating no injury and 10 indicating that all plants were killed.

TABLE V

[In the above described test, the compound of Example 1 (GLC–508) showed the following herbicidal activity]

| Chemical | Lbs./#/AC acre | Pig weed | Tomato | Radish | J. grass | Oats | Wheat | Cukes | R.K.B. | Cotton |
|---|---|---|---|---|---|---|---|---|---|---|
| GLC–508 | 5 | 10 | 10 | 10 | 10 | 5 | 3 | 10 | 8 | [1] 9 |
| Karmex | 2 | 10 | 10 | 10 | 8 | 4 | 2 | 10 | 7 | [2] 2 |
| Control | | 0 | 0 | 0 | 0 | 0 | 0 | 0 | 0 | 0 |

[1] Desiccation; [2] Yellowing.

To more accurately determine the acivity of GLC–508, it was tested at various levels of application using a solvent-emulsifier system consisting of 50% Velsicol AR–50G, 40% Butyl Carbitol Acetate and 10% Triton X–161 as the emulsifying agent. The results of this test are shown in Table VI.

TABLE VI.—SECONDARY POST EMERGENCE HERBICIDAL EVALUATION

| Chemical | Dose #/AC | Pig weed | Tomato | Radish | J. grass | Oat | Wheat | Cukes | R.K.B. | Cotton |
|---|---|---|---|---|---|---|---|---|---|---|
| GLC–508 | 4 | 10 | 10 | 10 | 10 | 10 | 9 | 10 | 9 | 8 |
| | 2 | 10 | 10 | 10 | 10 | 9 | 8 | 8 | 7 | 5 |
| | 1 | 9 | 8 | 4 | 7 | 2 | 0 | 10 | 9 | 1 |
| | ½ | 2 | 4 | 4 | 2 | 0 | 0 | 10 | [1] 4 | 0 |
| | ¼ | 0 | 0 | [1] 2 | 0 | 0 | 0 | 9 | [1] 2 | 0 |
| Karmex | 4 | 10 | 10 | 10 | 8 | 8 | 8 | 10 | 9 | 7 |
| | 2 | 10 | 10 | 8 | 6 | 6 | 6 | 8 | 8 | 2 |
| | 1½ | 10 | [1] 4 | 9+ | 3 | 2 | 1 | 10 | 9 | [1] 1 |
| | .75 | 10 | [1] 3 | 8 | 1 | 0 | 0 | 10 | 8 | [1] 1 |
| | .375 | 10 | [1] 2 | 7 | 1 | 0 | 0 | 10 | 8 | [1] 1 |
| Check | | 0 | 0 | 0 | 0 | 0 | 0 | 0 | 0 | 0 |

[1] Yellowing.

The present invention is not to be considered limited to the exact materials, compounds, compositions, proportions, methods, or procedures shown and described, as obvious modifications and equivalents will be apparent to one skilled in the art, and the invention is therefore to be limited only by the full scope of the appended claims.

What is claimed is:

1. A diquaternary dihalide halogen complex of the formula

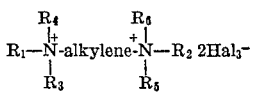

wherein $R_1$ and $R_2$ are alkyl of 4 to 18 carbon atoms, inclusive; $R_3$, $R_4$, $R_5$ and $R_6$ are lower-alkyl of 1 to 4 carbon atoms, inclusive; alkylene contains 1 to 3 carbon atoms, inclusive; and, halogen of $Hal_3^-$ has an atomic weight of 35 to 80, inclusive.

2. A compound of claim 1 wherein $Hal_3^-$ is $Br_3^-$.
3. A compound of claim 2 wherein alkylene is ethylene.
4. A compound of claim 1 wherein $R_1$ and $R_2$ are n-dodecyl.
5. A compound of claim 1 wherein $R_3$, $R_4$, $R_5$ and $R_6$ are $CH_3$.
6. A compound of claim 1 having the formula

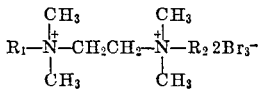

wherein $R_1$ and $R_2$ have the values given in claim 1.

7. The compound of claim 6 of the formula

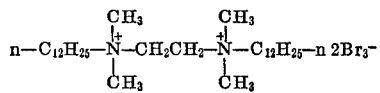

References Cited

UNITED STATES PATENTS 3,432,409  3/1969  Schuler et al. ____ 260—567.6 B

FOREIGN PATENTS 1,056,546  1/1967  Great Britain __ 260—567.6 M
1,155,258  6/1969  Great Britain ___ 260—567.6 M HOWARD T. MARS, Primary Examiner M. W. GLYNN, Assistant Examiner U.S. Cl. X.R.

71—121, 70; 260—999